United States Patent
Bogers

(10) Patent No.: US 9,992,529 B2
(45) Date of Patent: Jun. 5, 2018

(54) METHOD AND APPARATUS FOR EXCHANGING VIDEO BETWEEN MEDIA DEVICES

(71) Applicant: TELEFONAKTIEBOLAGET L M ERICSSON (PUBL), Stockholm (SE)

(72) Inventor: Yvo Bogers, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days. days.

(21) Appl. No.: 14/896,535

(22) PCT Filed: Jun. 14, 2013

(86) PCT No.: PCT/EP2013/062415
§ 371 (c)(1),
(2) Date: Dec. 7, 2015

(87) PCT Pub. No.: WO2014/198339
PCT Pub. Date: Dec. 18, 2014

(65) Prior Publication Data
US 2016/0134922 A1    May 12, 2016

(51) Int. Cl.
*H04N 21/858* (2011.01)
*H04N 21/436* (2011.01)
(Continued)

(52) U.S. Cl.
CPC ....... *H04N 21/436* (2013.01); *H04N 21/4122* (2013.01); *H04N 21/4126* (2013.01);
(Continued)

(58) Field of Classification Search
CPC combination set(s) only.
See application file for complete search history.

(56) References Cited

U.S. PATENT DOCUMENTS 8,958,747 B2  2/2015  Baek et al.
9,020,429 B2*  4/2015  Dua ................. G06F 17/30058
                                        340/10.51
(Continued)

FOREIGN PATENT DOCUMENTS

CN    102123197 A    7/2011
EP    2 341 693 A1   7/2011
WO    2013022177 A1  2/2013

OTHER PUBLICATIONS

International Search Report dated Sep. 19, 2013, in International Application No. PCT/EP2013/062415, 4 pages.
(Continued)

*Primary Examiner* — Kieu Oanh T Bui
(74) *Attorney, Agent, or Firm* — Rothwell, Figg, Ernst & Manbeck, P.C.

(57) ABSTRACT

Accordingly, there is provided a method in a first media device arranged to display a video. The method comprises receiving a selection of a video, and receiving an instruction from a user to display the video on a second media device. The method further comprises, in response to said instruction from the user, requesting an indication from the user as to where on a display of the second media device to display the video. The method further comprises receiving an indication from the user as to where on the display of the second media device to display the video. The method further comprises sending an instruction to the second media device, the instruction indicating where the second media device should display the video; and transferring video playback from the first media device to the second media device.

14 Claims, 3 Drawing Sheets

(51) Int. Cl.
*H04N 21/41* (2011.01)
*H04N 21/422* (2011.01)
*H04N 21/431* (2011.01)
*H04N 21/61* (2011.01)

(52) U.S. Cl.
CPC ... *H04N 21/42224* (2013.01); *H04N 21/4312* (2013.01); *H04N 21/4316* (2013.01); *H04N 21/43615* (2013.01); *H04N 21/6125* (2013.01); *H04N 21/858* (2013.01)

(56) References Cited

U.S. PATENT DOCUMENTS

| | | | |
|---|---|---|---|
| 2013/0040623 A1 | 2/2013 | Chun et al. | |
| 2013/0045681 A1 | 2/2013 | Dua | |
| 2014/0168344 A1* | 6/2014 | Shoemake | H04N 7/147 348/14.01 |
| 2014/0223490 A1* | 8/2014 | Pan | H04N 21/42224 725/61 |

OTHER PUBLICATIONS

"Know your apps: SwipeIt" Jul. 2, 2012, XP002705004, http://web.archive.org/web/20120723080801/http://www.samsung.com/us/article/know-your-apps-swipeit/ [retrieved on Jul. 22, 2013], 2 pages.
"AirPlay" Apple TV, Mar. 15, 2012, XP002705715, http://web.archive.org/web/20120315090039/http://www.apple.com/appletv/airplay/ [retrieved on Jul. 22, 2013], 6 pages.
Chinese Search Report dated Sep. 25, 2017, in Chinese Application No. 201380077433.0, 2 pages.

\* cited by examiner

METHOD AND APPARATUS FOR EXCHANGING VIDEO BETWEEN MEDIA DEVICES

CROSS REFERENCE TO RELATED APPLICATION(S)

This application is a 35 U.S.C. § 371 National Phase Entry Application from PCT/EP2013/062415, filed Jun. 14, 2013, designating the United States, the disclosure of which is incorporated herein in its entirety by reference.

TECHNICAL FIELD

The present application relates to a method in a first media device arranged to display a video, a method in a second media device, a first media device, a second media device, a computer-readable medium, and a user terminal.

BACKGROUND

It is common for a user to access media on a handheld media device such as a smartphone or tablet. Such a device is well suited to personal consumption of media. In some circumstances a user will want to share content that they have found on their handheld media device with others. In such a circumstance the display of the handheld device may be too small or have too small a viewing angle to make group viewing comfortable. Further, the speakers of the handheld media device may not be powerful enough to allow all the other users to hear the content. To address this scenario, some media devices allow media playback to be easily transferred from a handheld device to a television.

Samsung™ Swipe It is an application available for Android and iOS devices that allows a user to select content on their handheld device and select it for playback on a Samsung Smart TV. To enable this feature, a user must activate respective apps on both the handheld device and the Smart TV. The user must then pair the TV and the handheld device using a code displayed on the TV. The user may then select a video or picture on their handheld device and using a swipe gesture transfer the display of that content to the TV. To allow this feature to work both devices must be connected to the same local WiFi network.

Apple™ have a similar feature in iOS called Airplay. While a user is consuming content on a handheld iOS device, the user can select to also output the content on an AppleTV, if one is available. The selection is made from a menu which can be brought up during playback of content on the handheld device.

These implementations do not address how to resolve a conflict of interest between a program already being displayed by the TV and content that will be transferred thereto from a handheld media device. There is thus a need for an improved method and apparatus for exchanging video between media devices.

SUMMARY

Accordingly, there is provided a method in a first media device arranged to display a video. The method comprises receiving a selection of a video, and receiving an instruction from a user to display the video on a second media device. The method further comprises, in response to said instruction from the user, requesting an indication from the user as to where on a display of the second media device to display the video. The method further comprises receiving an indication from the user as to where on the display of the second media device to display the video. The method further comprises sending an instruction to the second media device, the instruction indicating where the second media device should display the video; and transferring video playback from the first media device to the second media device.

Accordingly, a user is given the option of where on the display of a second media device to display the content to be transferred from the first media device. The transferred video occupies less than the whole display area of the second device. On the remaining area of the display of the second device any content that was previously being displayed by the second media device continues to be displayed. Thus, both the original content and the transferred content are displayed on the second media device at the same time, resolving any conflict of use.

The method may further comprise playing the selected video. The method may further comprise receiving the instruction from a user to display the video on a second media device during video playback.

The transfer of video playback may comprise transmitting a video file from the first media device to the second media device. The transfer of video playback may comprise transmitting a portion of a video file from the first media device to the second media device. The transfer of video playback may comprise streaming video from the first media device to the second media device. The transfer of video playback may comprise sending a link to a video file hosted on a third device from the first media device to the second media device. The transfer of video playback may comprise handing over a streaming session from the first media device to the second media device.

The instruction from a user to display the video on a second media device may comprise a swipe gesture. The swipe gesture may comprise a swipe with a plurality of fingers.

Requesting an indication from the user as to where on a display of the second media device to display the video may comprise displaying a first image indicative of the display of the second media device together with a second image indicative of the video, the second image displayed in front of the first image. The second image may be resizeable, the size of the second image relative to the first image indicating the size of the video displayed on the second media device relative to the total display area of the second media device. The second image may be moveable, the position of the second image relative to the first image indicating the position of the video displayed on the second media device relative to the total display area of the second media device.

Once the size and/or position of the second image relative to the first image are set by the user, the user executes a confirm command via the user interface, the confirm command triggering an indication to be sent to the second media device, the indication indicating where to display the video on the display of the second media device. The confirm command may comprise releasing the second image. Releasing the second image may comprise a touchend event in touch screen device. The confirm command may comprise a specific gesture on a touch screen device. The confirm command may comprise a user interaction with a particular area of the screen, such as a confirm button.

The instruction indicating where the second media device should display the video that is sent from the first media device to the second media device may be sent as a file prior to the video being sent. If the first media device receives from the user an updated indication of the size and/or position of the video relative to the display of the second media device, a revised instruction may be sent to the second media device.

The video may be streamed from the first device to the second device. The first and second media devices may connect via the internet.

The first and second media devices may connect via a wireless connection. The wireless connection may be WiFi™, Bluetooth™, wireless HDMI, or similar such connection. The wireless connection may be via a direct transmission between the first and second media devices. The wireless connection may be via a network such as a WiFi™ network or a cellular communications network.

The first media device may connect to a local network via a wireless connection; the second media device may connect to the same local network via a wired connection.

There is further provided a method in a second media device. The method comprises receiving an instruction from a first media device, the instruction indicating where the second media device should display a video; and receiving the video from the first media device. The method further comprises displaying the video according to the instruction from the first media device indicating where the second media device should display a video The second media device may play an initial video, and upon receiving the video from the first media device, display the video from the first media device in front of the initial video.

The video may be streamed from the first device to the second device. The first and second media devices may connect via a wireless connection.

There is further provided a first media device comprising a user interface, a processor, a user interface and a transmitting means. The user interface arranged to receive a selection of a video, and an instruction from a user to display the video on a second media device. The processor arranged to, in response to said instruction from the user, request an indication from the user as to where on a display of the second media device to display the video. The user interface arranged to receive an indication from the user as to where on the display of the second media device to display the video. The transmitting means arranged to send an instruction to the second media device, the instruction indicating where the second media device should display the video; the transmitting means further arranged to send the video from the first media device to the second media device.

There is further provided a second media device comprising a receiver, a display and a processor. The receiver arranged to communicate with a first media device. The display is arranged to display at least one video. The processor is arranged to process received communications and to control images on the display. The processor is arranged to output a video on the display, the video received from the first media device and the video displayed according to an instruction received from the first media device, the instruction indicating where the second media device should display the video.

There is further provided a computer-readable medium, carrying instructions, which, when executed by computer logic, causes said computer logic to carry out any of the methods defined herein.

There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

There is further provided a user terminal comprising a processor and memory, said memory containing instructions executable by said processor. The user terminal is operative to receive a selection of a video and an instruction from a user to display the video on a second media device. The user terminal is operative to, in response to said instruction from the user, request an indication from the user as to where on a display of the second media device to display the video. The user terminal is operative to receive an indication from the user as to where on the display of the second media device to display the video. The user terminal is operative to send an instruction to the second media device, the instruction indicating where the second media device should display the video. The user terminal is operative to send the video from the first media device to the second media device.

There is further provided a user terminal comprising an antenna, display, transceiver, processor and memory, said memory containing instructions executable by said processor. The user terminal is operative to receive a selection of a video and an instruction from a user to display the video on a second media device. The user terminal is operative to, in response to said instruction from the user, request an indication from the user as to where on a display of the second media device to display the video. The user terminal is operative to receive an indication from the user as to where on the display of the second media device to display the video. The user terminal is operative to send an instruction to the second media device, the instruction indicating where the second media device should display the video. The user terminal is operative to send the video from the first media device to the second media device.

BRIEF DESCRIPTION OF THE DRAWINGS

A method and apparatus for exchanging video between media devices will now be described, by way of example only, with reference to the accompanying drawings, in which.

DETAILED DESCRIPTION

FIG. 1 is a sequence of four figures (a, b, c and d) showing an example of interoperation between a first media device and a second media device. In this example the first media device is a smartphone 100 and the second media device is a television 200. Smartphone 100 has a display 120 which is coincident with a transparent touch sensitive surface to provide a touch screen interface. Television 200 has a display 220.

Figure 1A:
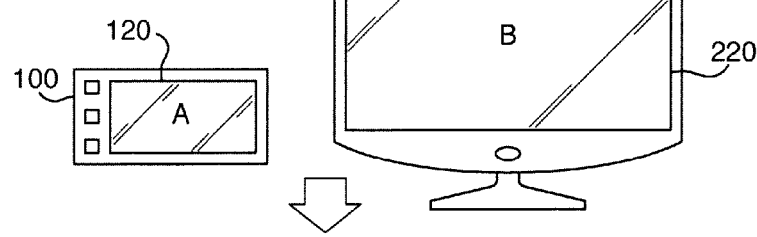
FIG. 1 is a sequence of four figures (a, b, c and d) showing an example of the method and apparatus disclosed herein.

FIG. 1a shows an initial state where smartphone 100 is displaying a first video (A) and television 200 is displaying a second video (B).

Smartphone 100 discovers a list of compatible target devices through some kind of existing means, i.e. either through a server that maintains a database of registered devices, or through a device discovery mechanism on the local network. The local network could be WiFi™ or Bluetooth™, or even a local wired connection such as Ethernet or HDMI.

The user instructs smartphone 100 to transfer video playback from the smartphone display 120 to the television display 220. Such an instruction could be performed by a simple swipe command where the television has been preselected as a default playback device. Alternatively such an instruction may be input via a menu and the selection of television 200 from a list of available devices.

Figure 1B:
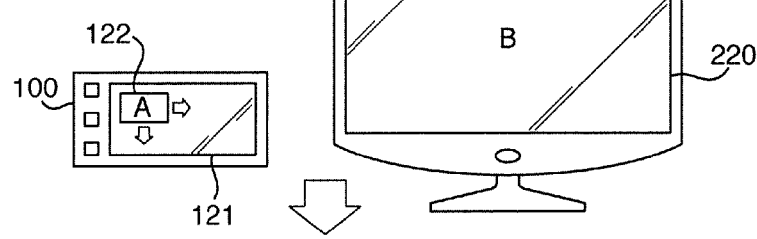

In response to such an instruction the smartphone 100 then displays a map of the display of the television display 220, as shown in FIG. 1b. The map comprises a first image 121 indicative of the display of the second media device together with a second image 122 indicative of the video, the second image 122 displayed in front of the first image 121. In FIG. 1 the first image 121 extends to the boundaries of display 120. In an alternative embodiment the first image 121 covers less than the whole of the smartphone display 120. Where the aspect ratio of the smartphone display 120 and the television display 220 are different, the first image 121 may extend to the boundary of the display in one direction but not in the other, perpendicular, direction. Alternatively, the proportions of the first image 121 may be changed to match the proportions of smartphone display 120, in which case, the proportions of the second image 122 are changed to the same extent.

The second image 122 may comprise a miniature video player icon, or even a reduced size window playing video A. The second image 122 is moveable by the user. In the embodiment the user touches the display 120 at the location of the second image 122 and drags the second image 122 to the desired location whereupon the user releases the image by removing their touch from the screen. The position of the second image 122 relative to the first image 121 indicates where on the display 220 of television 200 the user desires transferred video A to be displayed.

Figure 1C:
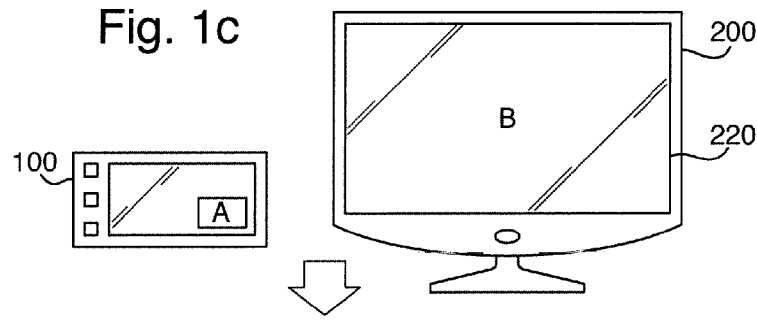

FIG. 1c shows the second image 122 has been moved towards the bottom right hand corner of the first image 121. By releasing their touch from the screen after moving the second image 122 to the desired location, the user executes a confirm command. This confirm command triggers an indication to be sent to the second media device, the indication indicating where to display the video on the display of the second media device.

The instruction indicating where the second media device should display the video is sent from the first media device to the second media device. Then the playback of video A is transferred from the smartphone 100 to the television 200.

Figure 1D:
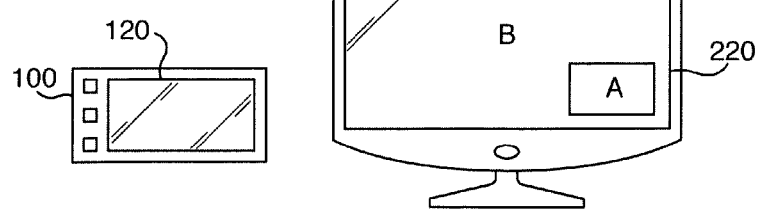

FIG. 1d shows the final status of the system with television 200 showing both the original content (B) and the transferred video (A), with video A displayed on the television display 220 in the position indicated by the user as shown in FIG. 1c. The television 200 thus displays a picture-in-picture (PiP) video player onscreen, the video player showing the video transferred from smartphone 100, and in the position indicated by the user using the interface displayed on smartphone 100. Thus the display area of the second media device is shared between the transferred video and the original content shown on the display.

Playback of video A may continue to be displayed on smartphone 100. Alternatively, the smartphone display 120 may cease display of video A after transfer to the television 200. In either case, smartphone 100 may display playback controls (pause, fast-forward, rewind, etc) after the video has been transferred. These controls are used to control playback of video A on television display 220. Commands from the user input via these controls may be implemented by issuing new video transfer commands from the smartphone 100 to the television.

Typically, video A will also have audio associated therewith, audio A. The audio associated with video A is not transferred to television 200.

The indication of where to display the transferred video on the display of the second media device may be sent as a file prior to the video being sent. Alternatively, the instruction may be sent together with a video transfer instruction. For example, if video A is being streamed to smartphone 100 from a server, then the video transfer instruction may comprise the address of the server and the particular video. This video transfer instruction will also include the desired position of video A on television display 220.

If the smartphone 100 receives from the user an updated indication of the size of the video relative to the display of the second media device, a revised instruction may be sent to the second media device. Following the preceding example where video A is streamed from a server, then in response to such an update a new video transfer instruction is issued. This video transfer instruction comprises the address of the server and the particular video, the updated desired position of video A on television display 220, and also a video playback position. The video playback position indicates how much of the video has already played and thus how far into the video A playback should begin, that is, at the updated desired position.

In a further embodiment the user may indicate the desired size of video A to be displayed on television display 220. The user performs such an indication by resizing the second image 122 as well as moving it relative to the first image area 121. The resized second image 122 indicates the size of the video displayed on television display 220 relative to the total display area of the television display 220.

Smartphones are able to play videos from a plurality of sources. Such sources include locally stored video files, remotely stored video files, and video streams received from a server. The method and apparatus for exchanging video between media devices that is described herein operates with any of these types of video playback. As such, the transfer of video playback from smartphone 100 to television 200 may comprise: transmitting a video file from the first media device to the second media device; transmitting a portion of a video file from the first media device to the second media device; streaming video from the first media device to the second media device; sending a link to a video file hosted on a third device from the first media device to the second media device; or handing over a streaming session from the first media device to the second media device.

The method and apparatus described herein enable the sharing of video content across screens without severely interrupting the ongoing experience on a screen with which a video is shared. This allows for an enriched TV experience; for example, the PiP video player could run a second camera feed in a sports event. That camera feed is located and selected using a smartphone.

The method and apparatus described herein may be used to add an additional video window to a television display 200 that is showing an at least one existing PiP window thereon. The existing PiP window may have been selected by smartphone 100, another device, or selected using the user interface of the television 200. Thus, using the method and apparatus described herein the user may select to display the additional PiP window in an area of the screen 220 not used by the existing PiP window or windows.

In an alternative embodiment, when the smartphone 100 receives an instruction to play video on the television 200, the smartphone 100 may interrogate the television 200 as to whether there are any existing video windows displayed on television display 220. If there are, the positions and sizes of these are reported back to the smartphone 100, and their position and size is indicated as additional images on smartphone display 120 when the user is selecting the position of second image 122 in relation to first image area 121. The user interface may prevent the user from requesting the transferred video is displayed in front of an existing PiP video window.

Therefore, where a TV screen that is already displaying a football match and one additional camera angle in a PiP window, a user can select and transfer to the TV screen a second PiP window which would allow the user to watch the F1 race on another channel at the same time.

Further, a display screen could then become a "mosaic" of video players. For example, as very large display screens become widely adopted, a user may prefer to have a relatively innocuous image filling the screen, such as a still image or a video of a landscape, and then overlay numerous PiP windows onto that display. By way of example, consider such a screen in a kitchen: there appropriate PiP windows may comprise a video of recipe instructions, a newsfeed, and a video feed from a baby monitor camera.

Figure 2:
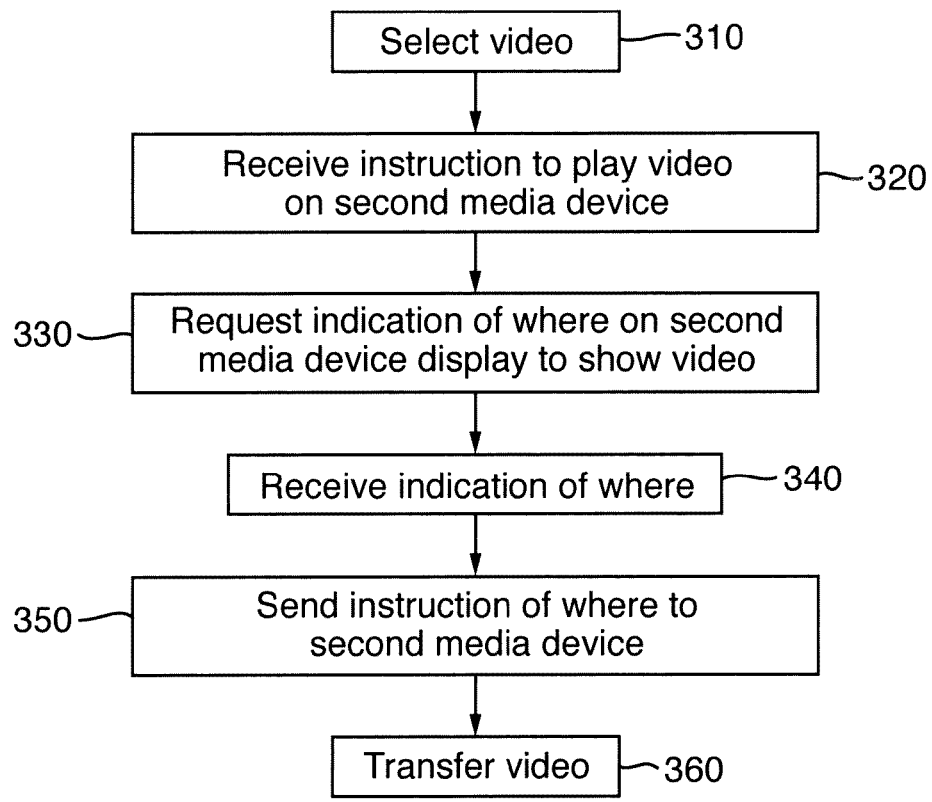
FIG. 2 illustrates a method performed in a first media device such as smartphone.

FIG. 2 illustrates a method performed in a first media device such as smartphone 100. At 310 the smartphone receives a selection of a video. In response to such a selection the smartphone may begin playback of the video on a smartphone display. At 320 the smartphone receives an instruction to play video on a second media device. At 330, the smartphone requests, via its user interface, an indication of where on the display of the second media device to show the video that is to be transferred. At 340, the smartphone receives, from the user, an indication of where on the display of the second media device to show the video that is to be transferred. At 350, the smartphone sends an instruction to the second media device the instruction indicating where on the display of the second media device the video that is to be transferred should be displayed. At 360, the video playback is transferred to the second media device.

In an alternative embodiment, the smartphone may first receive an instruction to play a video on a second media device prior to selection of the video to be played.

Figure 3:
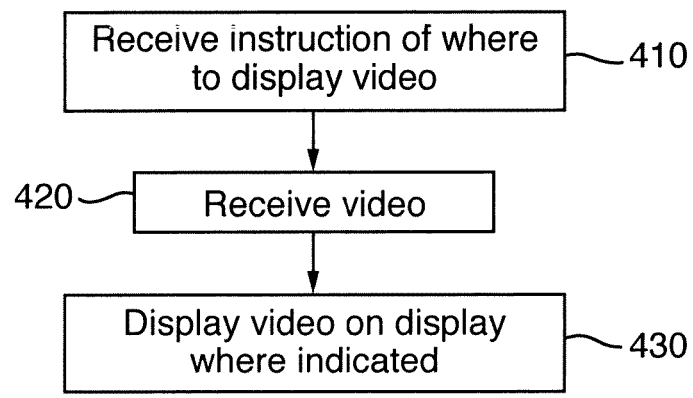
FIG. 3 illustrates a method performed in a second media device such as a television.

FIG. 3 illustrates a method performed in a second media device such as a television 200. This is equally applicable to a set-top box connected to a display. At 410, the television receives an instruction of where to display a video, the instruction received from a first media device. At 420, the television receives the video. The video may be received form the first media device. Alternatively, where the video is remotely hosted, the television receives the address of the video from the first media device, and at 420 the television accesses the received address and receives the video from the remote location. At 430 the television displays the received video on its display where indicated by the received instruction.

Figure 4:
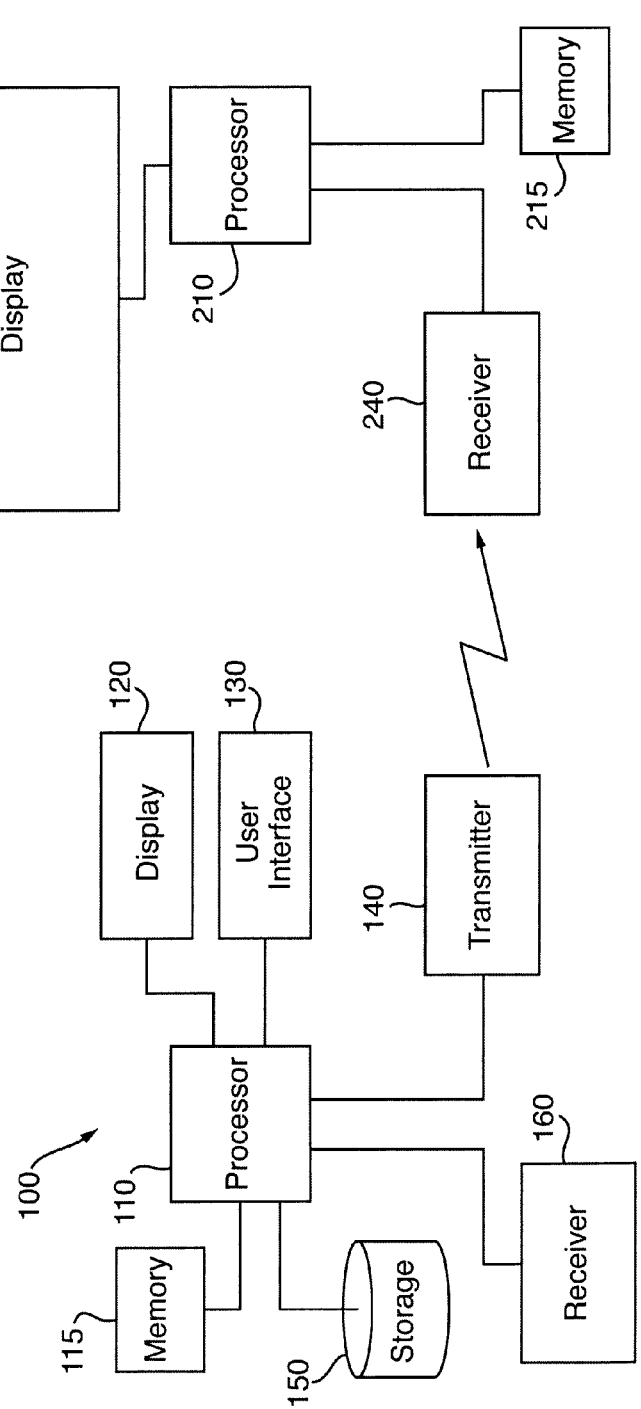
FIG. 4 illustrates apparatus suitable for performing the methods described herein.

FIG. 4 illustrates apparatus suitable for performing the methods described above. The apparatus comprises a first media device 100 and a second media device 200.

The first media device 100 comprises a processor 110, a memory 115, a display 120, a user interface 130, a transmitter 140, storage 150 and a receiver 160. The processor 110 is arranged to receive instructions which, when executed, causes the processor 110 to carry out the above described method. The instructions may be stored on the memory 115. The processor is arranged to decode and playback video on display 120. Video may be stored locally at storage 150, or received from an external source via receiver 160. The first media device 100 comprises a user interface 130 arranged to receive input from a user. The user interface 130 may take the form of a transparent touch sensitive surface on top of display 120, to form a touchscreen.

First media device 100 comprises a transmitter 140 suitable for communicating with a receiver 240 of a second media device 200. The second media device 200 comprises a processor 210, a memory 215, a display 220, and the receiver 240.

The processor 210 is arranged to receive instructions which, when executed, cause the processor 210 to carry out the above described method. The instructions may be stored on the memory 215. The processor 210 is further arranged to decode and playback video on display 220. The processor 210 is arranged to output video to display 220. The video may arrive at the second media device via an input and may be received from another device such as a PVR or set-top box. The video may arrive at the second media device as a radio frequency signal, the second media device comprising at least one tuner.

Within this document the wording "in front of" is used with reference to layers of a two dimensional display, whereby when a first object is displayed in front of a second object, the two overlapping in the two dimensional view, then where the two overlap only the first object is visible. When a first object is displayed in front of a second object the first object is displayed on top of the second object. When a first object is displayed in front of a second object the first object is in a higher priority display layer. In a three dimensional display, when a first object is displayed in front of a second object the first object may be shown closer to the viewer than the second object.

By way of example, Picture-in-Picture (PiP) is a term commonly applied to televisions, wherein a video window of a first video feed is displayed on the screen typically covering less than a quarter of the screen area. The video window is displayed in front of a full screen image of a second video feed. The area of the second video feed that is covered by the video window is not displayed on the screen.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method in a first media device arranged to display a video, the method comprising:
   the first media device receiving a selection of a first video;
   the first media device receiving a first instruction from a user to display the first video on a second media device;

in response to the first instruction from the user, the first media device displaying a map of a display of the second media device, wherein the map comprises a first image indicative of the first video together with a second image indicative of the display of the second media device, and wherein the first image is displayed in front of the second image;

the first media device receiving an indication from the user as to where on the display of the second media device to display the first video, wherein receiving the indication from the user comprises:
  detecting the user touch and drag the first image to a position on the map in relation to the second image, and
  detecting the user release the first image at the position on the map in relation to the second image, wherein the position on the map in relation to the second image indicates where on the display the second media device should display the first video;

as a result of detecting the user release the first image at the position on the map, the first media device sending a second instruction to the second media device indicating where on the display the second media device should display the first video; and the first media device transferring video playback to the second media device.

2. The method of claim 1, wherein the transfer of video playback comprises one or more of:
  transmitting a video file from the first media device to the second media device;
  transmitting a portion of a video file from the first media device to the second media device;
  streaming video from the first media device to the second media device;
  sending a link to a video file hosted on a third device from the first media device to the second media device; and
  handing over a streaming session from the first media device to the second media device.

3. The method of claim 1, wherein the first instruction from the user to display the video on a second media device is a swipe gesture.

4. The method of claim 1, wherein the first video is streamed from the first device to the second device.

5. The method of claim 1, wherein the first and second media devices connect via a wireless connection.

6. The method of claim 1, wherein the first and second media devices connect via the internet.

7. A method in a second media device, the method comprising:
  receiving an instruction from a first media device, wherein the instruction comprises an indication received by the first media device from a user regarding where to display a video on a display of the second media device and a size of the video in relation to the display of the second media device;
  receiving the video from the first media device; and
  displaying the video according to the instruction from the first media device indicating where the second media device should display the video,
  wherein the second media device plays an initial video, and upon receiving the video from the first media device, displays the video from the first media device in front of the initial video.

8. The method of claim 7, wherein the video is streamed from the first device to the second device.

9. The method of claim 7, wherein the first and second media devices connect via a wireless connection.

10. A first media device comprising:
  a user interface arranged to receive a selection of a first video, and a first instruction from a user to display the first video on a second media device;
  a processor arranged to, in response to the first instruction from the user, display a map of a display of the second media device, wherein the map comprises a first image indicative of the first video together with a second image indicative of the display of the second media device, and wherein the first image is displayed in front of the second image;
  the user interface arranged to receive an indication from the user as to where on the display of the second media device to display the first video, wherein receiving the indication from the user comprises:
    detecting the user touch and drag the first image to a position on the map in relation to the second image, and
    detecting the user release the first image at the position on the map in relation to the second image, wherein the position on the map in relation to the second image indicates where on the display the second media device should display the first video;
  a transmitter arranged to send a second instruction to the second media device indicating where on the display the second media device should display the first video as a result of detecting the user release the first image at the position on the map; and
  the transmitter further arranged to send the video from the first media device to the second media device.

11. A second media device comprising:
  a receiver arranged to receive an instruction from a first media device, wherein the instruction comprises an indication received by the first media device from a user regarding where to display a video on a display of the second media device and size of the video in relation to the display of the second media device;
  the receiver further arranged to receive the video from the first media device;
  a display for displaying at least one video; and
  a processor,
  wherein the processor is arranged to output the video on the display according to the instruction from the first media device indicating where the second media device should display the video, and
  wherein the processor is arranged to play an initial video, and upon receiving the video from the first media device, display the video from the first media device in front of the initial video.

12. A non-transitory computer-readable medium, carrying instructions, which, when executed by computer logic, causes said computer logic to carry out the method defined by claim 1.

13. A user terminal comprising a processor and a memory, said memory containing instructions executable by said processor whereby said user terminal is operative to:
  receive a selection of a first video;
  receive a first instruction from a user to display the first video on a second media device;
  in response to the first instruction from the user, display a map of a display of the second media device, wherein the map comprises a first image indicative of the first video together with a second image indicative of the display of the second media device, and wherein the first image is displayed in front of the second image;

receive an indication from the user as to where on the display of the second media device to display the first video, wherein receiving the indication from the user comprises:
   detecting the user touch and drag the first image to a position on the map in relation to the second image, and
   detecting the user release the first image at the position on the map in relation to the second image, wherein the position on the map in relation to the second image indicates where on the display the second media device should display the first video;
as a result of detecting the user release the first image at the position on the map, send a second instruction to the second media device indicating where on the display the second media device should display the first video; and
send the video from the first media device to the second media device.

14. A user terminal comprising an antenna, a display, a transceiver, a processor and a memory, said memory containing instructions executable by said processor whereby said user terminal is operative to:
   receive a selection of a first video and a first instruction from a user to display the first video on a second media device;
   in response to the first instruction from the user, display a map of a display of the second device, wherein the map comprises a first image indicative of the first video together with a second image indicative of the display of the second media device, and wherein the first image is displayed in front of the second image;
   receive an indication from the user as to where on the display of the second media device to display the first video, wherein receiving the indication from the user comprises:
      detecting the user touch and drag the first image to a position on the map in relation to the second image, and
      detecting the user release the first image at the position on the map in relation to the second image, wherein the position on the map in relation to the second image indicates where on the display the second media device should display the first video;
   as a result of detecting the user release the first image at the position on the map, send a second instruction to the second media device indicating where on the display the second media device should display the first video; and
   send the video from the first media device to the second media device.

* * * * *